United States Patent
Yamaura et al.

(10) Patent No.: US 8,163,223 B2
(45) Date of Patent: Apr. 24, 2012

(54) INJECTION MOLDING MACHINE AND CONTROL METHOD THEREOF

(75) Inventors: Hiroshi Yamaura, Nagano-ken (JP); Yoshimoto Unno, Nagano-ken (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 390 days.

(21) Appl. No.: 12/213,282

(22) Filed: Jun. 17, 2008

(65) Prior Publication Data

US 2008/0258326 A1 Oct. 23, 2008

Related U.S. Application Data

(62) Division of application No. 11/516,739, filed on Sep. 7, 2006.

(30) Foreign Application Priority Data

Sep. 8, 2005 (JP) .................................. 2005-260215

(51) Int. Cl.
*B29C 45/82* (2006.01)

(52) U.S. Cl. .................... 264/328.1; 264/40.1; 264/40.3; 264/40.4; 264/328.12; 264/328.13

(58) Field of Classification Search ................. 264/40.1, 264/40.3, 40.4, 40.5, 328.1, 328.11, 328.12, 264/328.13, 664, 667; 425/145, 149, 150

See application file for complete search history.

(56) References Cited

U.S. PATENT DOCUMENTS

| | | | |
|---|---|---|---|
| 5,443,587 A | 8/1995 | Takizawa | |
| 5,443,782 A | 8/1995 | Nakamura et al. | |
| 5,482,662 A | 1/1996 | Nakamura et al. | |
| 5,585,053 A | 12/1996 | Arai et al. | |
| 6,341,953 B1 | 1/2002 | Okubo et al. | |
| 6,477,837 B2 | 11/2002 | Kogane et al. | |
| 6,527,540 B1 | 3/2003 | Dantlgraber et al. | |
| 6,673,282 B2 * | 1/2004 | Matsubayashi et al. | 264/40.1 |
| 6,748,739 B1 | 6/2004 | Hirano et al. | |
| 6,805,827 B2 | 10/2004 | Kami et al. | |
| 2002/0180079 A1 * | 12/2002 | Matsubayashi et al. | 264/40.1 |
| 2003/0003178 A1 | 1/2003 | Kami et al. | |
| 2004/0012122 A1 | 1/2004 | Nagaoka et al. | |

FOREIGN PATENT DOCUMENTS

| | | | |
|---|---|---|---|
| JP | 62-2708039 A | | 11/1987 |
| JP | 2-283879 A | | 11/1990 |
| JP | 5-177679 A | | 7/1993 |
| JP | 11-105094 | * | 4/1999 |
| JP | 2001-88191 A | | 4/2001 |
| JP | 3245707 B2 | | 11/2001 |

* cited by examiner

*Primary Examiner* — Joseph Del Sole
*Assistant Examiner* — Seyed Masoud Malekzadeh
(74) *Attorney, Agent, or Firm* — Birch, Stewart, Kolasch & Birch, LLP

(57) ABSTRACT

When controlling each operational process in a molding cycle by variably controlling the number of revolutions of a drive motor 3 in a hydraulic pump 2, a hydraulic pump 2 where at least multiple fixed discharge flow rate Qo and Qs can be set is used as the hydraulic pump 2. At the same time, the fixed discharge flow rates Qo ... are set corresponding to operational processes based upon predetermined conditions in advance, respectively, and the hydraulic pump 2 is switched to the fixed discharge flow rates Qo ... by corresponding to each operational process at the time of molding. At the same time, each operational process is controlled by variably controlling the number of revolutions of the drive motor 3.

10 Claims, 3 Drawing Sheets

INJECTION MOLDING MACHINE AND CONTROL METHOD THEREOF

CROSS REFERENCE TO RELATED APPLICATION

This Application is a Divisional of co-pending application Ser. No. 11/516,739 filed on Sep. 7, 2006, and for which priority is claimed under 35 U.S.C. §120; and this application claims priority of Application No. 2005-260215 filed in Japan on Sep. 8, 2005 under 35 U.S.C. §119; the entire contents of all are hereby incorporated by reference.

BACKGROUND OF THE INVENTION

1. Field of the Invention

The present invention relates to an injection molding machine that controls each operational process in a molding cycle by variably controlling the number of revolutions of a drive motor in a hydraulic pump, and a control method thereof.

2. Description of the Relevant Art

Conventionally, an injection molding machine equipped with a hydraulic drive member where the number of revolutions of a drive motor in a hydraulic pump is variably controlled, and that drives & controls hydraulic actuators, such as an injecting cylinder (hydraulic cylinder), based upon the number of revolutions. At the same time, the control of each operational process in a molding cycle is known in Japanese Patent Publication No. 32345707.

The injection molding machine (and the control method thereof) disclosed in the publication target improved stability of the pressure control by eliminating the fluctuations of control pressure at the time of pressure control, and it is designed such that the discharge flow rate and discharge pressure of the hydraulic pump are controlled by controlling the number of revolutions of a servomotor in a fixed discharge type hydraulic pump. At the same time, hydraulic oil discharged from the hydraulic pump is relieved to an oil tank by a relief circuit especially in order for the number of revolutions of the hydraulic pump in the fixed discharge type hydraulic pump to be always the number of revolutions away from an unstable region of the rotational resistance in the hydraulic pump, or greater.

However, the control method for the conventional injection molding machine (hydraulic drive unit) had the following problems to be resolved:

First, a large-sized servomotor is required in response to the capacity of the injection molding machine (maximum capacity) in order to control the discharge flow rate and the discharge pressure by controlling the number of revolution of the servomotor. Therefore, as a measure against an unstable region where the number of revolutions of the servomotor becomes smaller, when the hydraulic oil to be discharged from the hydraulic pump is relieved to an oil tank, the energy waste becomes great and it is disadvantageous from the standpoint of energy savings and running costs.

Secondly, since a large-sized servomotor is required in response to the maximum capacity of the injection molding machine, the servomotor itself becomes expensive, increasing the initial cost. In particular, the upsizing of the servomotor creates a greater capacity (greater electric current) of an attached servo circuit (servo amplifier), and ensures that the ability to withstand electric power in the servo circuit gradually increases the overall cost.

Thirdly, since all operations in the injection molding machine are controlled by a single servomotor, a region where the operational capability of the servomotor does not conform with each operational process of the injection molding machine easily occurs. Therefore, control tends to be unstable, disadvantageous from the standpoint of securing moldability and molding quality. At the same time increased overload frequency is disadvantageous from the standpoint of reliability and longer life, as well.

SUMMARY OF THE INVENTION

An objective of the present invention is to provide an injection molding machine where a separate measure against an unstable region where the number of revolutions of the drive motor becomes smaller is unnecessary or reducible, and where the saving energy properties can be improved and the running cost can be reduced, and to provide a control method thereof.

Moreover, another objective of the present invention is to provide an injection molding machine where the realization of servomotor miniaturization when using a servomotor as a drive motor enables reducing the entire initial cost including a servo circuit, and to provide a control method thereof.

In addition, another objective of the present invention is to provide an injection molding machine where the stabilization of control contributes to improved moldability and the quality of molded articles. At the same time, the avoidance or reduction of overload enables improved reliability and long life, and provides a method of control.

In order to achieve these objectives, the injection molding machine relating to the present invention is characterized by the fact that it is an injection molding machine equipped with a control means which controls each operational process in a molding cycle by variably controlling the number of revolutions of a drive motor in a hydraulic pump, a hydraulic pump where at least multiple fixed discharge flow rates can be set is used as a hydraulic pump. At the same time, the injection molding machine is equipped with a control means to switch the hydraulic pump to a fixed discharge flow rate corresponding to an operational process set based upon predetermined conditions, and to control each operational process by variably controlling the number of revolutions of the drive motor.

Moreover, the control method for the injection molding machine relating to the present invention is characterized by the fact that when controlling each operational process in the molding cycle by variably controlling the number of revolutions of the drive motor in the hydraulic pump, a hydraulic pump is used where at least multiple fixed discharge flow rates can be set. At the same time, fixed discharge flow rates are set corresponding to operational processes based upon predetermined conditions, respectively, and the hydraulic pump is switched to the fixed discharge flow rate corresponding to each operational process at the time of molding. At the same time, each operational process is controlled by variably controlling the number of drive motor revolutions.

DETAILED DESCRIPTION OF THE PREFERRED EMBODIMENT

A preferred embodiment relating to the present invention is described hereafter, based on the drawings. Furthermore, the attached drawings do not specify the present invention, but rather make the understanding of the present invention easier. Regarding any well-known portions, in order to avoid ambiguity of the invention, detailed descriptions are omitted.

First, a construction of an injection molding machine M relating to the present embodiment is described with reference to FIG. 3 and FIG. 4.

Figure 3:
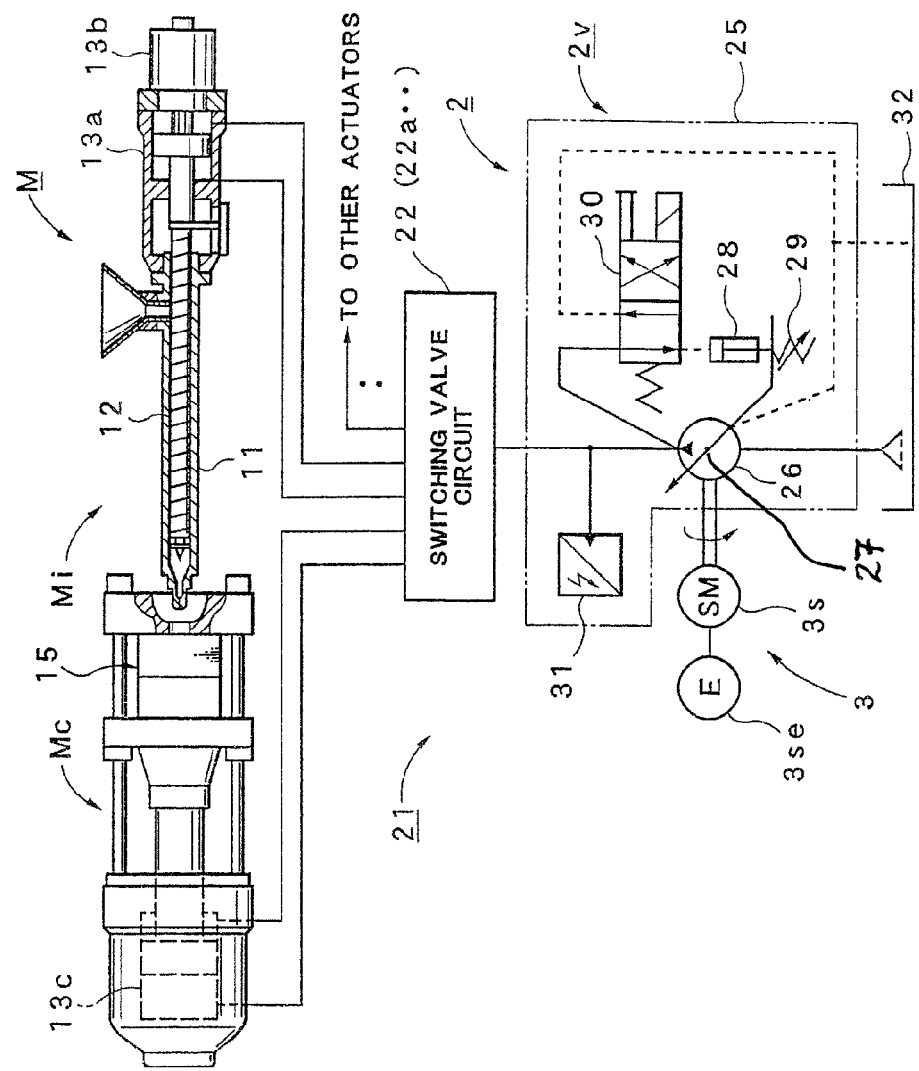
FIG. 3: A block diagram containing a hydraulic drive member of the injection molding machine used for the control method in FIG. 1.
Figure 4:
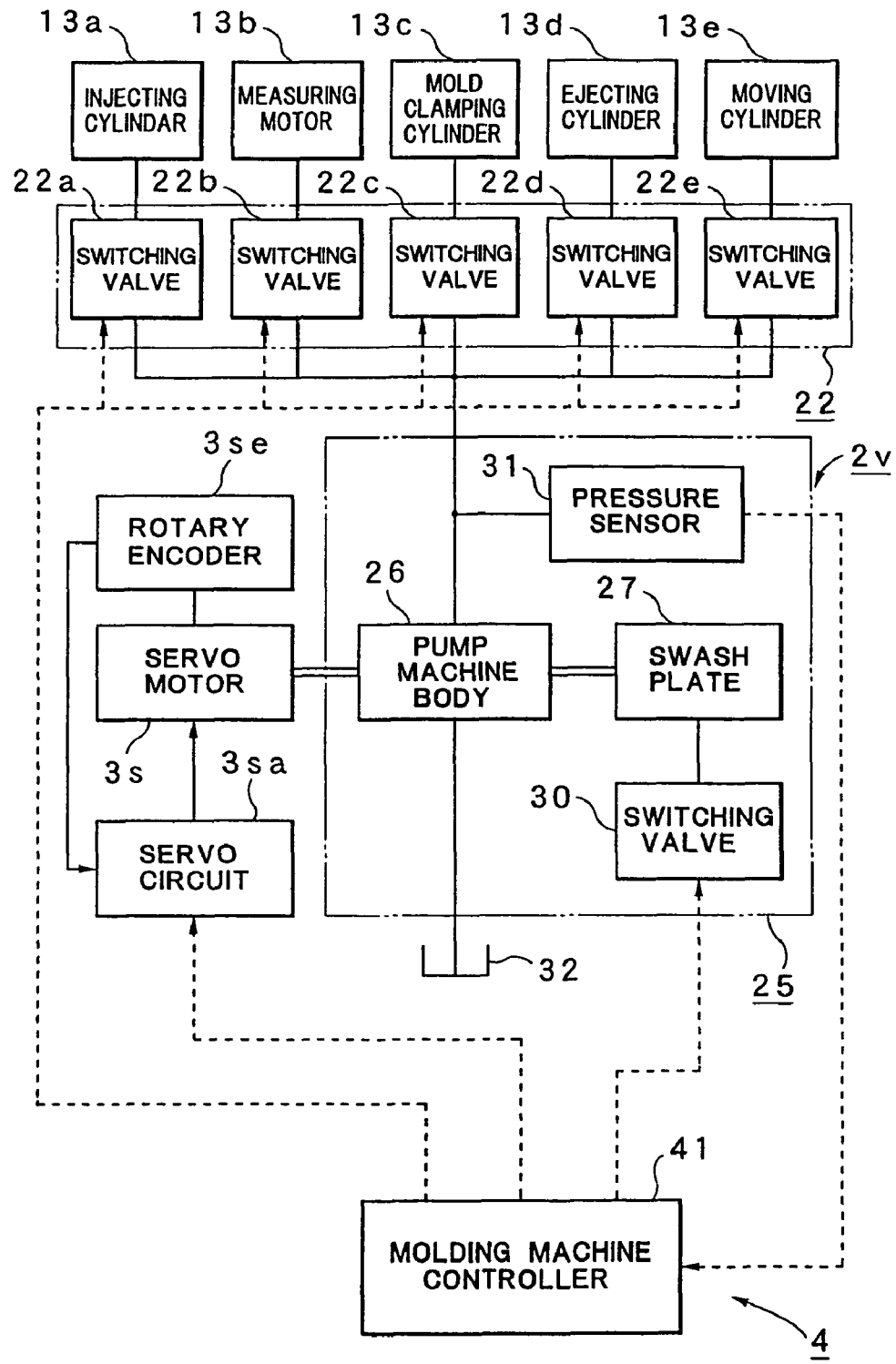
FIG. 4: A block circuit diagram of the hydraulic drive member in the injection molding machine in FIG. 3.

In FIG. 3, M is an injection molding machine, and is equipped with an injection unit Mi and a mold clamping unit Mc. The injection molding machine M is equipped with an injecting cylinder 13a that moves a screw 12, which is built in a heating cylinder 11 of the injection unit Mi, back and forth, and a measuring motor (oil motor) 13b that rotates the screw 12. At the same time, is equipped with a mold clamping cylinder 13c that opens/close and clamps a metal mold 15 in the mold clamping unit Mc, and an ejecting cylinder 13d (FIG. 4) that ejects a molded article from the metal mold 15, as the hydraulic actuators (13a . . . ). Moreover, it is also equipped with an injection device moving cylinder 13e (FIG. 4) that moves the injection unit Mi back and forth, and that attaches/detaches a nozzle to/from the metal mold 15.

In the meantime, 21 is a hydraulic drive member, equipped with a variable discharge type hydraulic pump 2v (hydraulic pump 2) comprising a hydraulic drive source, and a switching valve circuit 22. The variable discharge type hydraulic pump 2v is equipped with a pump 25 and a servomotor 3s (the drive motor 3) that drives and rotates the pump 35. In this case, an alternating servomotor connected to a servo circuit (servo amplifier) 3sa is used for the servomotor 3s. At the same time, a rotary encoder 3se is attached that detects the number of revolutions of this servomotor 3s.

Moreover, a pump machine body 26 composed of a swash plate type piston pump is built into the pump 25. Therefore, the pump 25 is equipped with a swash plate 27 (FIG. 4), and when the swash plate angle Rs, which is the angle of inclination of the swash plate 27, becomes larger, the stroke of the pump piston in the pump machine body 26 becomes greater and the discharge flow rate increases. At the same time, when the swash plate angle Rs becomes smaller, the stroke of the pump piston becomes smaller and the discharge flow rate decreases. Therefore, setting the swash plate angle Rs at a predetermined angle enables setting fixed discharge flow rates Qo . . . where the discharge flow rates is fixed to a predetermined magnitude. In addition, a control cylinder 28 and a return spring 29 are attached to the swash plate 27. At the same time, the control cylinder 28 is connected to an outlet of the pump 25 (a pump machine body 26) via a switching valve (electromagnetic valve) 30. With this design, the angle of the swash plate 27 can be changed by controlling the control cylinder 28. Furthermore, 31 is a pressure sensor to detect the discharge pressure of the pump 25.

Therefore, if the number of revolutions of the servomotor 3s is variably controlled, the discharge flow rate and the discharge pressure of the variable discharge type hydraulic pump 2v become variable, and the above cylinders 13a, 13c, 13d and 13e and the measuring motor 13b can be driven and controlled based upon these discharge flow rate and discharge pressure. At the same time, each operational process in the molding cycle can be controlled. As described, if the variable discharge type hydraulic pump 2v where the fixed discharge flow rates Qo . . . can be set by the change of the swash plate angle Rs is used for the hydraulic pump 2 or the servomotor 3s is used for the drive motor 3, the control method relating to the present embodiment can be easily and reliably implemented. At the same time, efficacies according to the control method can be more effectively enjoyed.

In the meantime, an inlet of the pump 25 is connected to the oil tank 32. At the same time, an outlet of the pump 25 is connected to the primary side of a switching valve circuit 22; in addition, as shown in FIG. 4, the secondary side of the switching valve circuit 22 is connected to the injecting cylinder 13a, the measuring motor 13b, the mold clamping cylinder 13c, the ejecting cylinder and the injection unit moving cylinder 13e, which comprise the hydraulic actuator in the injection molding machine M, respectively. Therefore, the switching valve circuit 22 is equipped with at least switching valves (electromagnetic valves) 22a, 22b, 22c, 22d and 22e to connect to the injecting cylinder 13a, the measuring motor 13b, the mold clamping cylinder 13c, the ejecting cylinder and the injection unit moving cylinder 13e, respectively. Furthermore, the switching valves 22a . . . are composed of necessary attaching hydraulic components including one or two or more valve components, respectively, and have functions relating to at least supply, stoppage and discharge of the injecting cylinder 13a, the measuring motor 13b, the mold clamping cylinder 13c, the ejecting cylinder and the injection unit moving cylinder 13e, respectively.

Moreover, 4 is a control means equipped with a molding machine controller 41. The servomotor 3s is connected to the molding machine controller 41 via the servo circuit 3sa. At the same time, the rotary encoder 3se attached to the servomotor 3s is connected to the servo circuit 3sa. In addition, the switching valves 22a, 22b, 22c, 22d and 22e using an electromagnetic valve, the switching valve 30 and the pressure sensor 31 are connected to the molding machine controller 41, respectively.

Next, the control method relating the present embodiment using the injection molding machine M is described with reference to FIG. 1 to FIG. 4.

First, the fixed discharge flow rates Qo . . . corresponding to each operational process in the molding cycle is set based upon predetermined conditions. In particular, in the control method relating to the present embodiment, three operation modes (swash plate angle modes) combining two operational processes and two fixed discharge flow rates Qo and Qs are set, and it is designed to be able to switch the discharge flow rate of the variable discharge type hydraulic pump 2v to the fixed discharge flow rates Qo . . . corresponding to the operational processes by selecting the operation mode at the time of molding, respectively.

Figure 2:
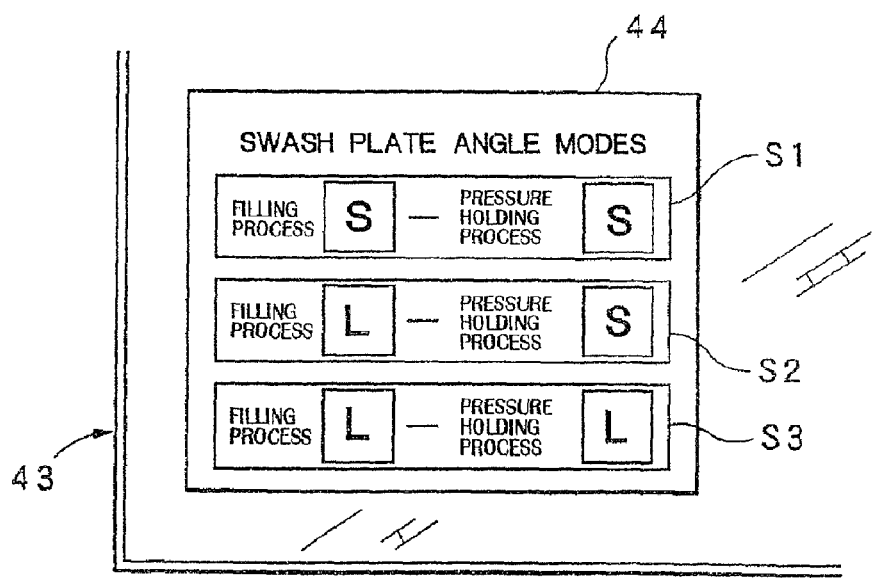
FIG. 2: A display screen diagram of a setting display used for the control method in FIG. 1.

FIG. 2 shows a portion of the setting screen displayed on a display 43 attached to the molding machine controller 41. The drawing shows a setting display 44 to select the swash plate angle modes, and is equipped with three mode selection keys S1, S2 and S3 for setting (selecting) the swash plate angle modes. Furthermore, the display 43 is a touch panel type, and touching the mode selection key S1, S2 or S3 enables the selection of the corresponding swash angle mode (operation mode).

In this case, in the two fixed discharge flow rates Qo and Qs, one fixed discharge flow rate Qo is set as a standard discharge flow rate. Therefore, the swash plate angle Rs is set to a comparatively small angle (smaller capacity side). In the meantime, the other fixed discharge flow rate Qs can be set at greater than the fixed discharge flow rate Qo, specifically, approximately twice of the fixed discharge flow rate Qo.

Therefore, it is possible to set the flow rate where the swash plate angle Rs is set at a comparatively large angle (larger capacity side). In other words, it is possible to set the other fixed discharge flow rate Qs at a flow rate that hardly affects the servomotor 3s adversely when the time period is comparatively short (approximately several seconds); but it may adversely affect the servomotor 3s if it lasts a comparatively long time.

Figure 1:
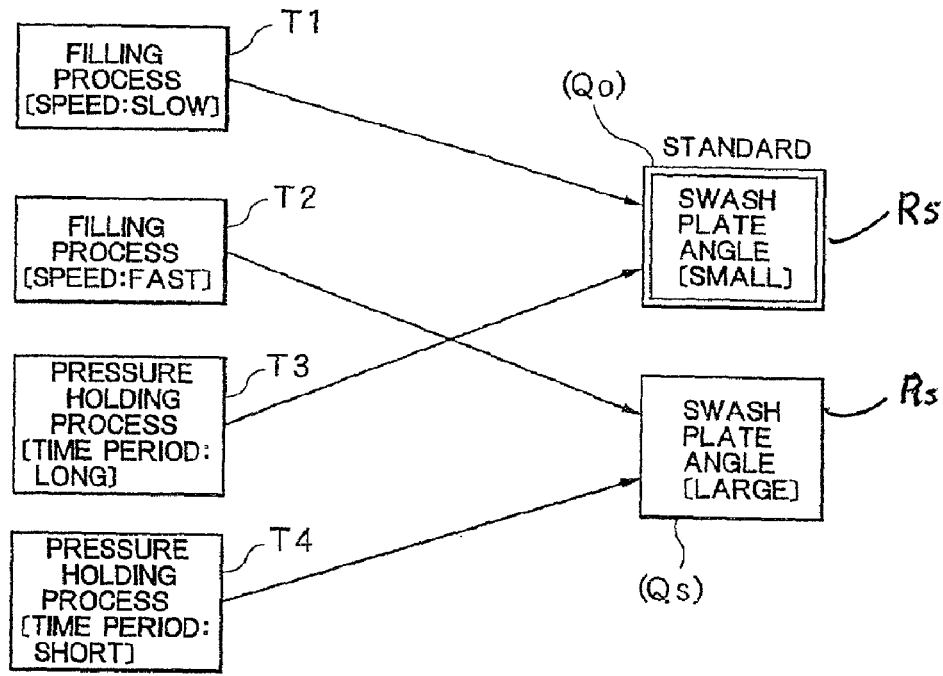
FIG. 1: A principle explanatory diagram of a control method for an injection molding machine relating to the most preferred embodiment of the present invention.

Moreover, a filling process and a pressure maintenance process were applied to the two operation modes. Furthermore, operational processes other than these are not a selection subject in the swash plate angle modes, and the flow rate is preset at the standard fixed discharge flow rate Qo. The combination of the fixed discharge flow rates Qo . . . with respect to the filling process and pressure maintenance process can be set as shown in FIG. 1. In other words, in the filling process, the fixed discharge flow rates Qo and Qs are set according to the injection speed (predetermined condition) in the filling process. Specifically, when the speed in the filling process (injection speed) is slow (Condition T1), for example, 50 [%] or less relative to the rating speed, the fixed discharge flow rate Qo where the swash plate angle Rs becomes smaller is set. At the same time, when the speed in the filling process (injection speed) is fast (Condition T2), for example, 100 [%], which is the rating speed, the fixed discharge flow rate Qs where the swash plate angle Rs becomes greater is set.

In the meantime, in the pressure maintenance process, the fixed discharge flow rates Qo and Qs can be set according to the time period of the pressure maintenance process (predetermined conditions). Specifically, the fixed discharge flow rate Qo is set when the time period of the pressure maintenance process is normal or longer (Condition T3). At the same time, the fixed discharge flow rate Qs is set when the time period of the pressure maintenance process is shorter (Condition T4) or when the pressure fluctuation when switching from the filling process to the pressure maintenance process is great.

Since the above setting becomes possible, in the setting display 44 shown in FIG. 2, a first swash plate angle mode (mode selection key S1) where the fixed discharge flow rate Qo is set both in the filling process and the pressure maintenance process;

a second swash plate angle mode (mode selection key S2) where the fixed discharge flow rate Qs is set in the filling process and the fixed discharge flow rate Qo is set in the pressure maintenance process; and a third swash plate angle mode (mode selection key S3) where the fixed discharge flow rate Qs is set both in the filling process and the pressure maintenance process were established.

Therefore, for example, in the molding state when the speed in the filling process (set speed) is slow, the mode selection key S1 can be selected. Moreover, when the speed in the filling process is fast, the mode selection key S2 can be selected. When the screw is moved forward at high speed, because a large flow rate becomes required, the second swash plate angle mode to be selected according to the mode selection key S2 is preferable. In addition, when the speed in the filling process is fast and the pressure fluctuation when switching from the filling process to the pressure maintenance process is great, or when the time period in the pressure maintenance process is short, the mode selection key S3 can be selected. Cases where the third swash plate angle mode to be selected according to the mode selection key S3 are few. However, it is effective when the high-speed filling is required and the pressure in the pressure maintenance process is drastically reduced, for example, when the thickness of a molded article is extremely thin.

As described above, if the operation mode where the operational process and the fixed discharge flow rates Qo . . . are combined is set and it is designed such that the operation mode is selected and a fixed discharge flow rate can be switched to the fixed discharge flow rate Qo . . . corresponding to the operational process at the time of molding, there is the advantage of simplifying control. At the same time, it becomes possible to easily and accurately implement [the present invention] from a viewpoint of users. Moreover, since the filling process and the pressure maintenance process are contained in the operational process, the most desirable performance from the viewpoint of satisfying both the control simplification and enjoyable effects can be obtained. At the same time, since the time period, the speed and the pressure in the operational process are used as predetermined conditions, it is advantageous that the control method relating to the present embodiment be implemented in the most preferable mode.

In the meantime, the swash plate angle mode (operation mode) is selected by each of the mode selection keys S1 . . . at the time of molding. Therefore, the selection of any mode selection key S1 . . . results in the setting of the fixed charge flow rate Qo or Qs based upon the selected swash plate angle mode by the various discharge type hydraulic pump 2v in the filling process and the pressure maintenance process and concurrently setting the fixed discharge flow rate Qo, which is standard, in other processes. Moreover, each operational process including the filling process and the pressure maintenance process is controlled by variably controlling the number of revolutions of the servomotor 3s.

A specific control example is described hereafter. As one example, a case where the mode selection key S2 (the second swash plate angle mode) is selected is assumed. In this case, a predetermined switch signal is provided from the molding machine controller 41 to the switching valve 30 in the filling process, and the flow rate is switched from the standard fixed discharge flow rate Qo to the fixed discharge flow rate Qs. In other words, switching control of the switching valve 30 results in changing the angle of the swash plate 27 to the larger swash plate angle Rs. As a result, the variable discharge type hydraulic pump 2v is operated as a large capacity hydraulic pump 2 that discharges the fixed discharge flow rate Qs, which become a large flow rate. Then, the specific operation control, such as the injection speed, in the filling process is controlled by the servomotor 3s. Therefore, the large flow rate enables moving the screw 12 forward at high speed and high torque in the filling process. In this case, the load to the servomotor 3s becomes large. However, because of the short operation time, it will not adversely affect the servomotor 3s.

In the meantime, the complete filling process results in the shift to the pressure maintenance process. In the pressure maintenance process, a predetermined switch signal is provided from the molding machine controller 41 to the switching valve 30, and the flow rate is switched from the fixed discharge flow rate Qs to the standard fixed discharge flow rate Qo. In other words, the switch control of the switching valve 30 results in changing the angle of the swash plate 27 to the smaller swash plate angle Rs. As a result, the variable discharge type hydraulic pump 2v is operated as a small capacity hydraulic pump 2 that discharges the fixed discharge flow rate Qo, which becomes a smaller flow rate. Then, the specific operation control in the pressure maintenance process, such as a pressure holding force, is conducted by the control of the servomotor 3s. Since a large flow rate is unnecessary in the pressure maintenance process and it is merely for securing torque, the servomotor 3s is a standard operation, and the high pressure holding force described in this standard operation (or a low pressure holding force) can be provided throughout a comparatively long time.

Furthermore, as described above, the fixed discharge flow rate Qo is set in the other operational processes, such as a measurement process, a mold clamping process and an ejecting process. Therefore, the variable type hydraulic pump 2 is operated as a hydraulic pump 2 to discharge at the fixed discharge flow rate Qo, which becomes standard (a small flow rate). At the same time, specific pressure control and speed control in each process are conducted by the control of the servomotor 3. Moreover, even when the other mode selection key S1 (the first swash plate angle mode) or the mode selection key S3 (the third swash plate angle mode) is selected, a similar control is conducted based upon the corresponding setting.

Therefore, according to the control method relating to the present embodiment, the hydraulic pump 2 where the multiple fixed discharge flow rates Qo and Qs can be set is used, and the hydraulic pump 2 is switched to the fixed discharge flow rate Qo . . . corresponding to each operational process. At the same time, each operational process is controlled by variably controlling the number of revolutions of the drive motor 3, so in the case of viewing from the drive motor 3, the hydraulic pump 2 can be separately used as multiple hydraulic pumps from the smaller capacity type to the larger capacity type. Therefore, this contributes to improved energy savings and reduced running costs, such as a separate measure against an unstable region where the number of revolutions of the drive motor 3 becomes small becoming unnecessary or reducible. Moreover, the hydraulic pump 2 can be separately used as multiple pumps from a smaller capacity type to a larger capacity type; therefore, as it becomes possible to select the drive motor 3 having a lower capacity compared to the maximum capacity of the injection molding machine M by limiting to the operating time as a larger capacity type hydraulic pump, the realization of miniaturization of the servomotor 3s when using the servomotor 3s as the drive motor 3 enables the reduction of the entire initial cost including the servo circuit. In addition, the region where the operation capacity of the drive motor 3 does not conform with each operational process in the injection molding machine M can be reduced, the control can be stabilized, contributing to improved moldability and molding quality. At the same time, avoidance or reduction of overload contributes to improved reliability and long-life.

The preferred embodiment was described in detail. However, the present invention is not limited to this embodiment, and a construction, a method and number of the details can be optionally modified without departing from the concept of the present invention. At the same time, they can be added or deleted as the occasions demand.

For example, as the hydraulic pump 2 where the multiple fixed discharge flow rates Qo . . . can be set was illustrated as the variable discharge hydraulic pump 2v where the fixed discharge flow rates can be set according to the change of the swash plate angle Rs. However, another hydraulic pump 2 having a similar function can be used. Moreover, the servomotor 3s was illustrated as the drive motor control each operational process in the molding cycle by variably controlling the number of revolutions. However, another drive motor 3 having a similar function can be used. In the meantime, the case where the two fixed discharge flow rates Qo and Qs are set was illustrated. However, three ore more fixed discharge flow rates Qo . . . can be set. In addition, the time period, the speed and the pressure in the operational process were illustrated as the predetermined conditions. However, these shall not eliminate other conditions. In the meantime, the case where one or two or more operation modes, where the fixed discharge flow rates Qo . . . corresponding to each operational process are combined, are set and the operation modes are selected at the time of molding was illustrated. However, it can be designed such that the set fixed discharge flow rates Qo . . . can be simply selected according to the selection keys, and that these can be automatically set (selected) corresponding to the information, such as the molding conditions. Moreover, as the operational processes, the case where the filling process and the pressure maintenance process are adopted was illustrated. However, only either one can be adopted, and other operational process can be added.

What is claimed is:

1. A control method for an injection molding machine, comprising:
   controlling at least two operational processes in a molding cycle by variably controlling a number of revolutions of a drive motor in a hydraulic pump which is capable of setting a first fixed discharge flow rate Qo for enabling the hydraulic pump to function as a small-capacity hydraulic pump, and a second fixed discharge flow rate Qs for enabling the hydraulic pump to function as a large-capacity hydraulic pump having a capacity larger than the small-capacity hydraulic pump,
   setting the hydraulic pump to one of the first and second fixed discharge flow rates Qo, Qs corresponding, respectively, to each of the at least two operational processes based upon one or more predetermined conditions of the injection molding machine determined in advance by an operator, and
   switching the hydraulic pump to one of the first and second fixed discharge flow rates Qo, Qs corresponding, respectively, to each of the at least two operational processes while concurrently, each of the operational processes are controlled by variably controlling the number of revolutions of the drive motor,
   wherein the step of setting the first and second fixed discharge rates Qo, Qs is performed by changing an operation mode of the hydraulic pump, and further comprising: changing the operation mode of the hydraulic pump by changing an angle Rs at which a swash plate of the hydraulic pump is positioned from one to another of a plurality of fixed positions.

2. The control method for an injection molding machine according to claim 1, wherein the one or more conditions determined in advance includes at least a time period for performing the operational processes.

3. The control method for an injection molding machine according to claim 1, wherein the one or more conditions determined in advance includes at least a speed for performing the operational processes.

4. The control method for an injection molding machine according to claim 1, wherein the one or more conditions determined in advance includes at least pressure in at least one of for performing the operational processes.

5. The control method for an injection molding machine according to claim 1, wherein, the first and second fixed discharge flow rates include a fixed discharge flow rate Qo at a smaller flow rate side, which is a standard discharge flow rate, and a second fixed discharge flow rate Qs at a larger flow rate side, which becomes larger than the fixed discharge flow rate Qo at the smaller flow rate side.

6. The control method for an injection molding machine according to claim 1, wherein the at least two operational processes includes a filling process.

7. The control method for an injection molding machine according to claim 1, wherein the at least two operational processes includes a pressure maintenance process.

8. The control method for an injection molding machine according to claim 1, wherein the step of setting the hydraulic pump to one of the first and second fixed discharge flow rates $Q_o$, $Q_s$ is performed by inputting a command into a controller of the injection molding machine which changes an angle $R_s$ at which a swash plate of the hydraulic pump is positioned from one to another of a plurality of fixed positions.

9. A control method for an injection molding machine, comprising:
   controlling at least two operational processes in a molding cycle by variably controlling a number of revolutions of a drive motor in a hydraulic pump which is capable of setting a first fixed discharge flow rate $Q_o$ and a second fixed discharge flow rate $Q_s$,
   based on one or more conditions determined in advance by an operator of the injection molding machine, setting the hydraulic pump to one of the two fixed discharge flow rates $Q_o$, $Q_s$ corresponding, respectively, to each of the at least two operational processes, and
   switching the hydraulic pump to the one of the two fixed hydraulic flow rates $Q_o$, $Q_s$ corresponding, respectively, to each of the operational processes while concurrently, each of the operational processes are controlled by variably controlling the number of revolutions of the drive motor,
   wherein the step of setting the two fixed discharge rates $Q_o$, $Q_s$ is performed by changing an operation mode of the hydraulic pump, and further comprising:
   changing the operation mode of the hydraulic pump by changing an angle $R_s$ at which a swash plate of the hydraulic pump is positioned from one to another of a plurality of fixed positions.

10. The control method for an injection molding machine according to claim 9, wherein the step of setting the one of the two fixed discharge rates is performed by inputting a command into a controller of the injection molding machine which changes an angle $R_s$ at which the swash plate of the hydraulic pump is positioned from one to another of a plurality of fixed positions.

* * * * *